Dec. 13, 1960   E. SCHASCHL ET AL   2,964,723
DEVICE FOR DETERMINING UNDERGROUND CORROSIVENESS
Filed April 23, 1959   3 Sheets-Sheet 1

INVENTORS
EDWARD SCHASCHL
GLENN A. MARSH
BY
Edward H. Lang
ATTORNEY

INVENTORS
EDWARD SCHASCHL
BY GLENN A. MARSH
Edward H. Lang
ATTORNEY

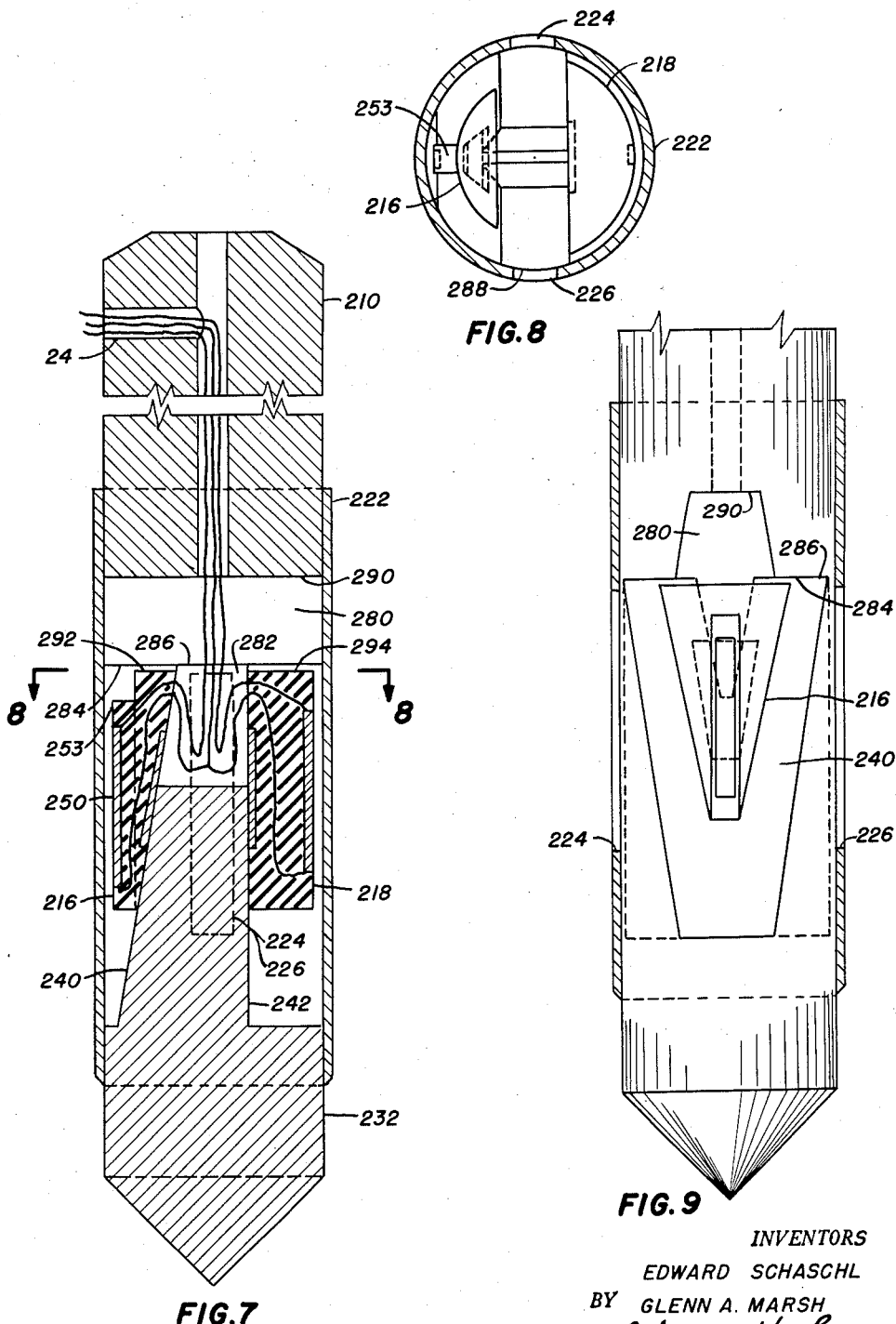

United States Patent Office 2,964,723
Patented Dec. 13, 1960

2,964,723

DEVICE FOR DETERMINING UNDERGROUND CORROSIVENESS

Edward Schaschl and Glenn A. Marsh, Crystal Lake, Ill., assignors to The Pure Oil Company, Chicago, Ill., a corporation of Ohio Filed Apr. 23, 1959, Ser. No. 808,329

14 Claims. (Cl. 338—13)

This invention relates to improved corrosion-test probes for use with corrosion-testing apparatus, and more particularly relates to corrosion-test probes having sufficient rigidity, durability, and physical strength so that they may be forced or pounded down into the earth. The invention lies particularly in a test probe which encloses and protects the sensitive corrosion-test elements while the probe is being driven into the earth, but then exposes these test elements and forces them into intimate contact with the subsoil.

It is frequently necessary to determine the corrosive characteristics of subsurface soil. For example, in selecting the route for a pipeline, the corrosive characteristics of the soil along alternate proposed routes may be a crucial factor in determining which route should be selected. It may also be desirable to locate optimum points at which to employ sacrificial anodes for the cathodic protection of buried metal structures.

The prior art teaches various test-probe structures which may be used in corrosion studies. These test probes employ fragile metallic test elements which must be exposed to the corrosive environment to be tested. These fragile test elements would be distorted or ruptured if the test probes known to the prior art were forced or driven into the earth.

Briefly, this invention discloses a rugged and durable test probe which may be driven or pounded into the earth to suitable depths. Contained and protected within the test probe are the delicate test elements. When the test probe is in place in the earth, the shaft or driving member of the probe may be rotated relative to the body member, exposing the heretofore protected test elements and forcing them into intimate contact with the subsurface soil.

This invention takes advantage of the methods that have been devised which make use of the correlation between change in electrical conductivity and change in cross-sectional area, to determine the rate of corrosion of various materials of construction through the use of corrosion-test probes connected to electrical resistance-change meters. These instruments, known and widely used in the art, employ resistance bridges and function like analogue computers to indicate quantitatively a change in physical characteristics which cannot be conveniently measured by other methods. There are several recent modifications of this principle. One such modification is described in a copending application entitled, "Apparatus for Determining the Influence of Corrosion on Metallic Materials of Construction," bearing Serial No. 528,032. This application describes means for compensating for temperature changes wherein one test specimen is mounted in exposed condition to the corrosive atmosphere and another test specimen is insulated or protected from the corrosive atmosphere by means of a suitable protective coating placed thereon. The coupons or test elements are connected in a circuit so as to comprise one-half of a typical resistance bridge. Suitable electrical connections are made with the other half of the bridge, which is placed outside the corrosive environment along with power supply to the bridge. An appropriate electrical meter, such as a galvanometer, functions as a null detector. Loss of metal on the unprotected element induces small increases in resistance in the circuit, and these increases are correlated with metal loss by appropriate formulae described in the application.

In U.S. Patent No. 2,830,265, Lynn E. Ellison describes an electronic apparatus for conveniently detecting and measuring changes in resistance, and provides for direct reading of the rate of corrosion. The corrosion-test probe of the present invention may be used in conjunction with the apparatus described in the foregoing patent. The corrosion-test probe of this invention is in part an improvement over the test probes previously proposed in that it is adapted to be used for measuring the corrosive characteristics of subsurface soil.

It becomes therefore a primary object of this invention to provide a corrosion-test probe to be used with an electrical resistance-measuring apparatus to determine the corrosivity of subsurface soil.

Another object of this invention is to provide a new form of corrosion-test probe capable of being driven to a suitable depth into the corrosive environment to be studied.

These and other objects of the invention will become apparent as the description thereof proceeds. The invention is best described by reference to the drawings in which.

Figure 4:
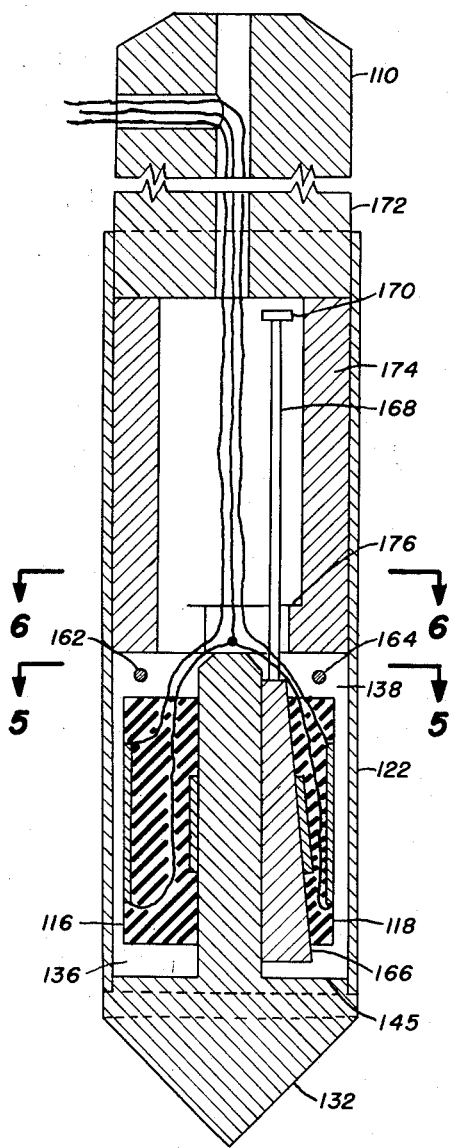
Figure 4 is a sectional front elevation of an alternate test-probe structure.
Figure 6:
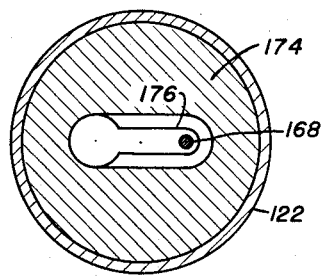
Figure 5:
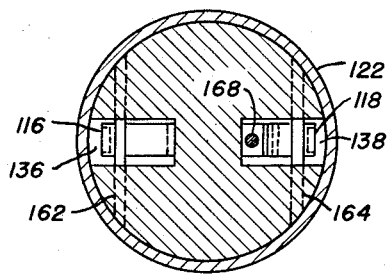

Figures 5 and 6 are sectional views in the planes 5—5 and 6—6 of Figure 4.

Figure 7 is a sectional front elevation of a second alternate test-probe structure.

Figure 8 is a sectional view in the plane 8—8 of Figure 7.

Figure 9 is a side elevation, partially in section, of part of the probe structure depicted in Figure 7.

Figure 2:
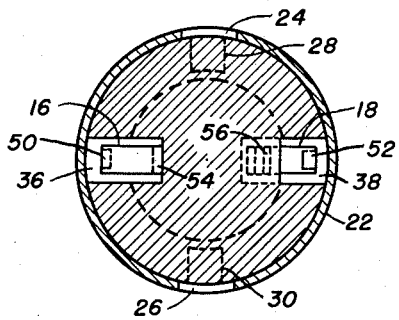
Figure 2 is a sectional view in the plane 2—2 of Figure 1.
Figure 1:
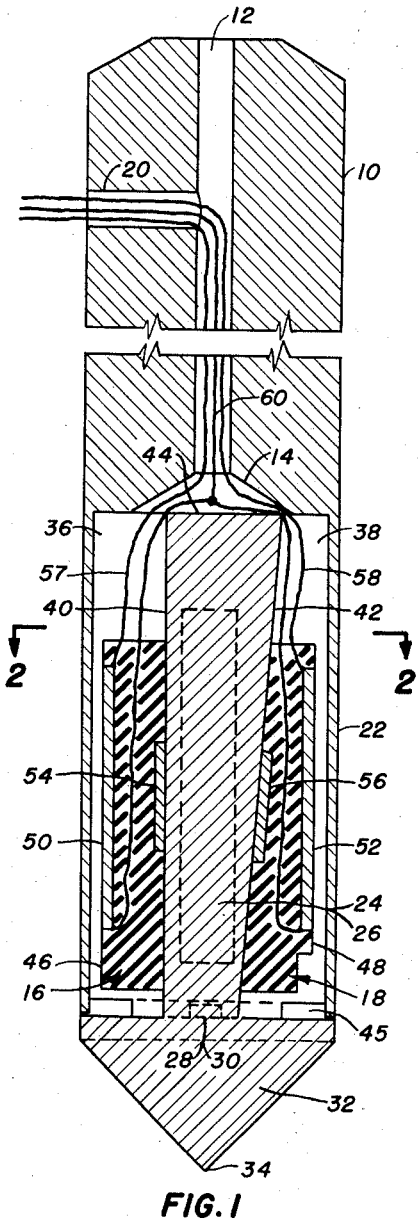
Figure 1 is a sectional front elevation of the novel test-probe.
Figure 3:
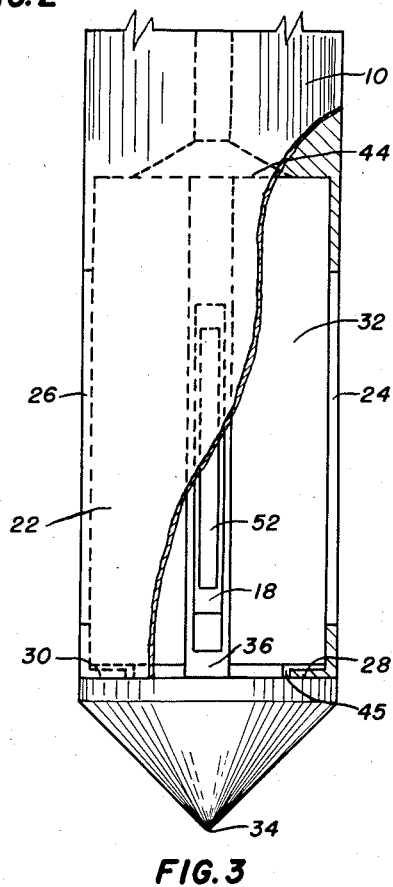
Figure 3 is a side elevation, partially in section, of part of the probe structure depicted in Figure 1.

The preferred embodiment of the apparatus of this invention is set out in Figures 1 to 3. Shaft 10 is cylindrical in cross-section and made from a good quality, high-carbon, cold-rolled steel. Hole 12, which extends axially through shaft 10, is enlarged at chamfer 14 and forms a passage through which electrical conductors may be run from test members 16 and 18 to the upper end of the shaft, where they pass through hole 20 and become accessible for connection to suitable electronic equipment. Shaft member 10 includes sleeve portion 22, which may be welded in place on the shank of shaft 10, but is preferably made integral with the shaft. In either case, sleeve 22 is equipped with two radially-opposed rectangular slots, 24 and 26. At the lower end of the sleeve and adjacent to the slots are two inwardly-depending lugs, 28 and 30. The probe body member 32 includes pointed head 34 which permits the whole apparatus to be driven more easily into the soil or other solid material, the corrosive characteristics of which are to be tested.

Body member 32 is preferably fabricated from a good quality, high-carbon, oil-hardening steel, which is oil-quenched to a hardness of about 60 "C" Rockwell, and drawn to relieve internal stresses. The body member is generally cylindrical in form but contains two longitudinal slots, 36 and 38, which extend from the base of the body member to a point adjacent to a conically-shaped head, 34. The interior surface of slot 36, that is, surface 40, is vertical. Surface 42, the interior surface of slot 38, is inclined outwardly from the center of the probe. The remaining surfaces of slots 36 and 38 are vertical and respectively parallel to each other and perpendicular to surfaces 40 and 42. The width and depth of the slots should be maintained at a minimum so that the sectional area of bast 44 of the body member is kept large. This minimizes deformation of either the shaft or body member when the test probe is driven into the earth. Adjacent to conical head 34 is circumferential groove 45, of sufficient depth and width to accommodate lugs 28 and 30 and permit the rotation of shaft member 10 relative to body member 32.

Contained in slots 36 and 38 are test members 16 and 18, respectively. The test members consist of blocks 46 and 48 which support test specimens 50 and 52, respectively. Two small magnets, 54 and 56, are imbedded in the interior faces of the blocks opposite the faces on which the test elements are supported. Block 46 is rectangular in shape, whereas block 48 is trapezoidal or wedge-shaped.

Blocks 46 and 48 may be fabricated from various electrically-insulating, corrosion-resistant materials. These blocks, however, are preferably made of a molded plastic, in which case the magnet and test element may be molded in place. Test elements 50 and 52 are preferably fabricated from the same material and have the same geometric form. Element 52 is coated with a corrosion-resistant material, but element 50 is left bare. Suitable coating materials are set out in U.S. Patent 2,851,570 to Edward Schaschl. The test elements may be of various shapes, as ribbon-like or in the shape of rods. They preferably have substantially the same resistivity, and are fabricated from steel foil. Although advantages accrue in constructing the test specimens from materials having the same resistance values, suitable unsymmetrical corrosion-testing elements can be fashioned in which the resistances of these elements are not identical, provided, for the sake of consistency, a material of construction is employed which is substantially uniform in composition and resistivity. In general, the ratio of the resistance of the protected test specimen to the resistance of the unprotected test specimen, may vary from values of 0.1 to 10. Although the values of these ratios of resistances may vary over wide limits, it is well known to those skilled in the art that, as a practical matter, there are numerous chemical and electrical factors which must be taken into consideration in the design of a suitable corrosion-test probe. These factors include lead resistance, the size of the assembly, and the factor of temperature compensation. Accordingly, by using test specimens which have substantially the same resistivity, the corrosion-test probe will function accurately when connected with the bridge-measuring circuit without the necessity for tedious calibration.

Conductors 57 and 58 are connected respectively to the upper ends of test elements 50 and 52. A third conductor 60 is connected to the lower ends of both test elements 50 and 52. When the test conductors are very long, the error introduced by the resistance of the conductors may be reduced by connecting two additional conductors, not shown, to the points of junction of the test elements and conductors 57 and 58. A Kelvin bridge rather than a Wheatstone bridge-measuring circuit may then be used.

In operation, the assembled test probe, including the shaft member, the body member, the test members, and the connected electrical conductors, is inserted into the environment to be tested. Care must be taken to be sure that sleeve-slots 24 and 26 in the sleeve portion of the shaft member are removed 90° from body member slots 36 and 38. The cylindrical portion of the body member will then be opposite the sleeve slots and form a seal to prevent the entry of foreign matter through the sleeve slots into the interior of the test probe. The test probe may be driven into the earth to the desired depth by means of a sledge hammer or other stake-driving devices. Where necessary, the shaft member may be made in two or more sections so that the probe may be more conveniently driven to greater depths. If desired, the shaft member may be equipped with an explosion platform, and a charge of explosive propellant placed on the platform to drive the rod into the earth. However, care must be taken to select a proper explosive of the kind commonly used with blast-driven earth rods.

After the probe has been driven into place, the shaft member is rotated 90° in either direction. The inwardly-depending lugs 28 and 30 are then located adjacent to slots 36 and 38. Slots 24 and 26 are then in position adjacent to the test members, and the test members are thus exposed to the environment surrounding the test probe. The shaft member is then drawn vertically upward and lug 28 or 30 engages test member 18, compelling it to slide upward and outward along surface 42 of the body member. The shaft member is raised until test member 18 has passed outward through slot 24 and is brought into firm contact with the surrounding subsoil. Test member 18 remains exposed to the corrosive subsoil, but within the probe, and shortly comes to the same conditions of temperature as test member 16. The electrical conductors are then connected to the corrosion-measurement circuits, and measurements are made from time to time to determine the extent of corrosion of test element 52.

When the tests have been completed, the shaft member is forced downward until lugs 28 and 30 register opposite groove 45. The upper edge of slot 24 engages the upper end of test member 18 and forces it downward. Magnet 56 draws test member 18 against surface 42 and the test member slides downward and inward to its original position within the test probe. The shaft member may then be rotated 90° causing lugs 28 and 30 to rotate in the slot provided. The whole apparatus may then be drawn vertically upward out of the earth.

After the test probe has been retrieved from the earth, the shaft member may again be rotated 90° and removed from the body member. The corroded test element may be removed, and a fresh test element inserted in its place. The shaft member is then reassembled in its original position relative to the body member, and the test probe is ready for re-use.

Figures 4 to 6 show an alternate construction for the test probe of this invention. Sleeve portion 122 of shaft member 110 contains no slots. Body member 132 contains an ungrooved, circular, disc portion, 145, which forms an improved seal with the lower extremity of sleeve portion 122. Test members 116 and 118 are identical with the test members of the embodiment first described; however, test member 118 is installed in an inverted position, that is, with the smaller end of the wedge-shaped block down. The body member is equipped with two pins 162 and 164 which limit the upward movement of the test members. The longitudinal slots 136 and 138 in the body member are identical, all three surfaces of both slots being vertical. Wedge block 166 supports test member 118, and is equipped with a draw rod 168 which has an expanded knob 170.

Shaft member 110 is made in three parts, which include sleeve portion 122, shaft portion 172, and T-slot portion 174. The T-slot portion contains T-slot 176, the slot being of such size as to accommodate draw rod 168, but too narrow to permit the passage of knob 170.

After this test probe has been driven into the ground to the desired depth, the rod member is raised vertically upward and slides from the body member, exposing the two test elements. T-slot 176 then engages knob 170 and draws wedge block 166 vertically upwardly. Since pin 164 prevents test member 116 from moving upward, the test member is forced outward by the rising wedge block into contact with the surrounding subsoil. Of course, a second wedge block 166 and test member 116 could be substituted for test member 118, in which case both test members would be forced outward into contact with the surrounding subsoil. In this embodiment of the invention, body member 132, as well as the test members, must be considered expendable, as they cannot be conveniently recovered from the earth.

A second alternate embodiment of the test probe is shown in Figures 7 to 9. In this adaptation, flat surfaces 240 and 242 replace the longitudinal grooves in the body member of the aforedescribed embodiments. Surface 242 is vertical, whereas surface 240 is inclined inwardly toward the center of the test probe.

A horizontal groove 280 passes across the lower end of shaft member 210. Groove 280 is of such size as to conveniently accommodate upper portion 282 of body member 232. Sleeve member 222 includes two slots 224 and 226. Test members 216 and 218 are similar to the aforedescribed test members, except that since they are supported by a surface rather than contained in a groove, the width of the test members is not restricted by the width of a surrounding groove. The outer portion of test member 216, which supports test element 250, has a narrow and extended portion 253 which is narrow enough to pass through sleeve slot 224 or 226. Opening 24 in shaft 210 provides a passageway for the electrical conductors.

The test probe is assembled with sleeve 222 surrounding the major portion of body member 232, and also surrounding test members 216 and 218. Surface 284 of the shaft member comes to rest in contact with surface 286 of the base of the body member. Slots 224 and 226 of the sleeve portion of thte shaft member are aligned adjacent to the cylindrical portion 288 of the body member, which prevents passage of soil through the slots in the sleeve member to the interior of the probe. After the test member has been driven to the desired depth, the shaft member is rotated 90° with respect to the body member, thus bringing slots 224 and 226 into alignment with the test members and exposing them to the surrounding soil. Groove 280 is then in alignment with base 282 of the body member. The shaft member may now be forced downward with respect to the body member until surface 290 of groove 280 contacts surface 286 of the body member. As the shaft member moves downward, surface 284 contacts surfaces 292 and 294 of test members 216 and 218, respectively. Both test members are forced downward, test member 216 being forced laterally outward into contact with the surrounding soil as it slides along surface 240 of the body member.

While the invention has been described in terms of the three specific structures disclosed, it must be understood that the invention is not intended to be so limited, but must be construed to include all equivalent structures which fall within the scope of the appended claims. Certain modifications of the specific structures disclosed will be obvious to those skilled in the art. For example, the test probe assemblies may be modified to include a plurality of test members, any or all of which may be moved radially outward into contact with the surrounding soil when test measurements are being made. This can be done by making body member 32 of Figure 1 with a plurality of grooves, such as groove 38, which could contain a test member, such as test member 16. Sleeve member 22 must then be correspondingly modified to permit the exposure and axial movement of each such test member.

While this invention has been described in terms of a corrosion-measuring test probe, it is apparent that the basic probe itself might be used for other measurements as well. For example, test member 16 of Figure 1 might be replaced by a thermocouple, and temperature measurements could thus be obtained. In short, the test probe disclosed may be employed whenever it is desired to insert delicate test instruments into the earth to a substantial depth, and then expose these instruments and force them into intimate contact with the surrounding subsoil.

What is claimed is:

1. A test probe comprising a test element, a rigid casing enclosing said test element and capable of being forced into the earth without substantial deformation, said casing comprising two members movable with respect to each other to expose said test element, and means cooperating with said two members for moving said test element outward from within said casing into contact with the material to be tested as said two members move with respect to each other.

2. An apparatus according to claim 1 in which said test element is an electrically-conductive, corrodible, metallic coupon.

3. An apparatus according to claim 2 which includes a second corrosion-insulated test element, electrically connected to said first-mentioned element.

4. A test probe comprising, in combination, a rigid elongated body member capable of being forced into the earth without substantial deformation, a shaft member engageable with one end of said body member, said shaft member including a sleeve portion closely fitting around a portion of said body member and cooperating therewith to form an enclosure for a test member, a test member within said enclosure, said shaft member being movable with respect to said body member to open said enclosure and thereby expoe said test member, and means cooperating with said body member and shaft member to move the test member outward from within said enclosure into contact with the material to be tested.

5. An apparatus according to claim 4 in which said test member comprises an electrically-conductive, corrodible, metallic element supported by an electrically-insulating, wedge-shaped block.

6. An apparatus according to claim 4 in which said shaft member moves axially with respect to said body member to expose said test member.

7. An apparatus according to claim 6 wherein said means comprises a wedge-shaped block supported by said body member and operably engageable by said shaft member for axial movement therewith.

8. An apparatus according to claim 4 in which said sleeve portion is slotted and the slot exposes said test member when said shaft member is rotated with respect to said body member.

9. An apparatus according to claim 8 in which said shaft member is axially movable with respect to the body member, the body member includes an inclined surface which supports the test member, and said shaft member is engageable with the test member to compel movement thereof along the inclined surface.

10. An apparatus for measuring the corrosive characteristics for sub-surface soil comprising in combination a rigid elongated body member capable of being forced into the earth without substantial deformation, a shaft member engageable with one end of said body member, said shaft member including a sleeve portion closely fitting around a portion of said body member and cooperating therewith to form an enclosure, a corrosion-test member comprising a corrosion-susceptible metallic element supported by an electrically-insulating, wedge-shaped member contained in said enclosure, a corrosion-insulated metallic element supported by an electrically-insulating member also contained in said enclosure, a first electric conductor connected to one end of said corrosion-susceptible element, a second conductor connected to one end of said corrosion-insulated element, a third conductor operably connected to the other ends of said metallic elements, said shaft member containing an axial aperture for the passage of said conductors to the surface of the earth and being movable with respect to said body member to open said enclosure and thereby expose the metallic elements to the sub-surface soil, and means cooperating with said body member and shaft member to move the metallic elements outward into contact with the sub-surface soil.

11. An apparatus according to claim 10 in which said shaft member moves axially with respect to said body member to expose said test member.

12. An apparatus according to claim 11 wherein said means comprises a wedge-shaped block supported by said body member, and operably engageable by said shaft member for movement therewith.

13. An apparatus according to claim 10 in which said sleeve portion is slotted and said slot exposes said test member when said shaft member is rotated with respect to said body member.

14. An apparatus according to claim 10 in which said shaft member is axially movable with respect to said body member, said body member includes an inclined surface which supports said test member, and said shaft member is engageable with said test member to compel movement thereof along the inclined surface.

References Cited in the file of this patent

FOREIGN PATENTS

| | | |
|---|---|---|
| 2,786 | Great Britain | Sept. 29, 1910 |
| 666,927 | Germany | Oct. 31, 1938 |